United States Patent
Roth et al.

[11] Patent Number: 5,823,867
[45] Date of Patent: Oct. 20, 1998

[54] METHOD AND APPARATUS FOR DETACHING MEAT FROM BONE

[75] Inventors: Eldon Roth; Ronald Yockey, both of Dakota Dunes, S. Dak.

[73] Assignee: Freezing Machines, Inc., Dakota Dunes, S. Dak.

[21] Appl. No.: 867,175

[22] Filed: Jun. 2, 1997

Related U.S. Application Data

[63] Continuation-in-part of Ser. No. 799,983, Feb. 12, 1997.
[51] Int. Cl.⁶ .................................................. A22C 17/04
[52] U.S. Cl. .......................................... 452/138; 452/141
[58] Field of Search ...................... 452/138, 141

[56] References Cited

U.S. PATENT DOCUMENTS

| | | | |
|---|---|---|---|
| 3,841,569 | 10/1974 | Engelhardt et al. | 452/138 |
| 4,025,985 | 5/1977 | Rousseau | 452/138 |
| 4,535,504 | 8/1985 | Prosenbauer | 452/138 |

Primary Examiner—Willis Little
Attorney, Agent, or Firm—Shaffer & Culbertson; Russell D. Culbertson

[57] ABSTRACT

Bones (10) with meat attached thereto are suspended in a substantially fluid medium (14). The fluid medium or matrix (14) includes meat, fat and other soft material (16) which behaves similarly to a fluid when a pressure is applied thereto. The substantially fluid medium (14) also includes a substantially compressible material (18) such as a gas included in voids within the matrix. Once the bones (10) are properly suspended, the entire matrix of material (14) is compressed from an initial pressure to a detachment pressure which may be in a range of 5 pounds per square inch over atmospheric to 1000 pounds per square inch over atmospheric. The meat attached to the bones (10) within the matrix (14) tends to migrate away from the bone and eventually detach from the bone. However, since of all of the bones (10) remain suspended in a substantially fluid medium, pressure is applied evenly across the entire surface of the bones without breaking the bones and contaminating the meat with bone fragments.

20 Claims, 6 Drawing Sheets

METHOD AND APPARATUS FOR DETACHING MEAT FROM BONE

This is a continuation-in-part of Ser. No. 08/799,983, filed Feb. 12, 1997.

BACKGROUND OF THE INVENTION

This invention relates to meat processing, and, more particularly, to a method for detaching meat from bone either before or after hand deboning. The invention also includes an apparatus for performing the meat detaching method according to the invention.

Particularly in beef and pork production, the majority of meat is manually removed from the prepared carcass. Beyond this manual separation process, numerous automated processes have been devised for recovering meat from a carcass or bone pieces. For example, heat may be applied to the whole carcass or bones left after the initial processing to cook the meat off the bones. To remove meat without applying heat, the bone and meat left after initial processing may be passed through a separator device having a separator screen and a blade which periodically passes over the screen openings. Pressure applied to the bone and meat within the separator device causes the meat to push out through the screen openings where it is periodically cut off by the passing blades.

There are several problems associated with prior methods for removing meat from bone. The process of removing cuts of meat manually in the traditional fashion is labor intensive and requires skilled workers. As for the automated processes, the heat required in heat processing changes the character of the meat and makes the recovered product unsuitable for incorporating into many other products. The screen-type processes are used mainly with bones and meat left after initial processing. Also, although prior screen-type separators are generally effective at separating a portion of the remaining meat from bone, these separators commonly leave some amounts of meat still attached to the bones. Another problem with conventional screen-type separators is that the blades in such separators can chip off portions of the bone and other hard undesirable material, and this undesirable material can pass through the screen openings to reduce the quality of the separated product. Furthermore, screen-type separators can only produce an emulsified or course ground product rather than a true solid muscle.

SUMMARY OF THE INVENTION

It is an object of the invention to provide a meat processing method that overcomes the above-described problems and others associated with prior meat processing systems. More particularly, it is an object of the invention to provide a method for detaching meat from bone while leaving the bone substantially intact. Another object of the invention is to provide an apparatus for detaching meat from bone.

The method according to the invention includes containing bone and attached meat in a particular manner while applying a detachment pressure to the bone and meat. The detachment pressure causes the meat attached to the bone to move with respect to the bone, eventually overcoming the strength of the attachment and causing the meat to detach. The invention is not necessarily a meat separating method in that the meat may not be segregated from the bone. Rather, the meat is simply detached, leaving the detached meat still mixed with the bone. Also, the process may not provide complete detachment from the bone, but may only isolate strong attachment points. However, since the method according to the invention leaves the meat substantially detached from the bone, the meat can be more easily separated from the bone by hand or by some other suitable process.

In order to produce the desired detachment, the bone and attached meat is suspended in a substantially fluid medium or matrix. The fluid medium includes a compressible medium, preferably a gas such as air, contained within voids within the remainder of material making up the fluid medium. With the bone and attached meat properly suspended, the method includes compressing the fluid medium from an initial pressure to the detachment pressure. As the pressure increases, the meat strands attached to the bone tend to flow or move with respect to the bone. When the pressure reaches the detachment pressure, the meat detaches at its attachment point to the bone. The detached meat is not separated, but remains with the bone to be separated by some suitable process.

In the preferred form of the invention, the substantially fluid medium or matrix comprises the compressible medium, bones or bone pieces with attached meat, and other soft material such as fat. The make-up of the matrix is important to maintain the desired suspension of bones during the compression process. If the matrix includes too much bone in relation to soft material, the bones may become trapped by the mechanism used to apply the detachment pressure, causing some of the bones in the matrix to break. The volume of meat and other soft material in relation to the volume of bone and the compressible medium must be sufficient to keep mechanical forces from concentrating on the bones throughout the compression process.

With the bones suspended in the substantially fluid material, the only pressure applied to the individual bones is pressure from the meat, the compressible medium, and any other soft material such as fat contained within the matrix. The meat, compressible medium, and other soft material in the matrix behave somewhat similarly to a fluid in the manner in which pressure is applied to the bones. This pressure presses evenly around the bones without any mechanical concentrations which would occur by direct contact between the bones and a compressing mechanism. Applying only fluid pressure to the bones leaves the individual bones substantially intact and in a condition in which the bones may be easily separated from the detached meat and other soft components.

As used herein, "bone" may include whole bones or cartilage, bone pieces cut from whole bones, or multiple whole bones remaining connected together, such as in a whole carcass or a substantial portion of a whole carcass. Thus, the method of the invention may be applied to whole carcasses or substantial portions of whole carcasses to produce an initial detachment. This initial detachment step makes manual and other separation processes easier and more effective in separating meat from bone.

The compressible medium may comprise any material or combination of materials which may reduce in volume as the pressure on the matrix of material increases to the detachment pressure. For example, the compressible medium may be a gas exposed directly to other materials in the matrix. Alternatively, the compressible medium may comprise a suitable fluid contained within a flexible or elastic containment device or bladder. The fluid in the containment device may be compressible or substantially incompressible. In this latter case, the containment device must have a passage through which the incompressible material may be withdrawn to reduce the volume of the containment device as the pressure increases on the matrix of material.

In the preferred form of the invention, the matrix of material is contained within a cylinder and the pressure is applied by a piston which may be extended into the cylinder. An input opening is associated with the cylinder and allows the material making up the matrix to be introduced into the cylinder. The input opening then may be closed to produce a pressure vessel for applying the desired detachment pressure. The detachment pressure which must be applied and which the vessel must be capable of withstanding, varies depending upon the type of meat being processed and the nature of the bones from which the meat is to be detached. The detachment pressure within the scope of the invention may range from 5 pounds per square inch or less to 1000 pounds per square inch or more as long as mechanical forces cannot concentrate on any of the bone pieces within the matrix. Higher pressure could tend to liquefy meat or produce some other undesirable effect in the meat.

These and other objects, advantages, and features of the invention will be apparent from the following description of the preferred embodiments, considered along with the accompanying drawings.

DESCRIPTION OF PREFERRED EMBODIMENTS

Figures 1, 1A:
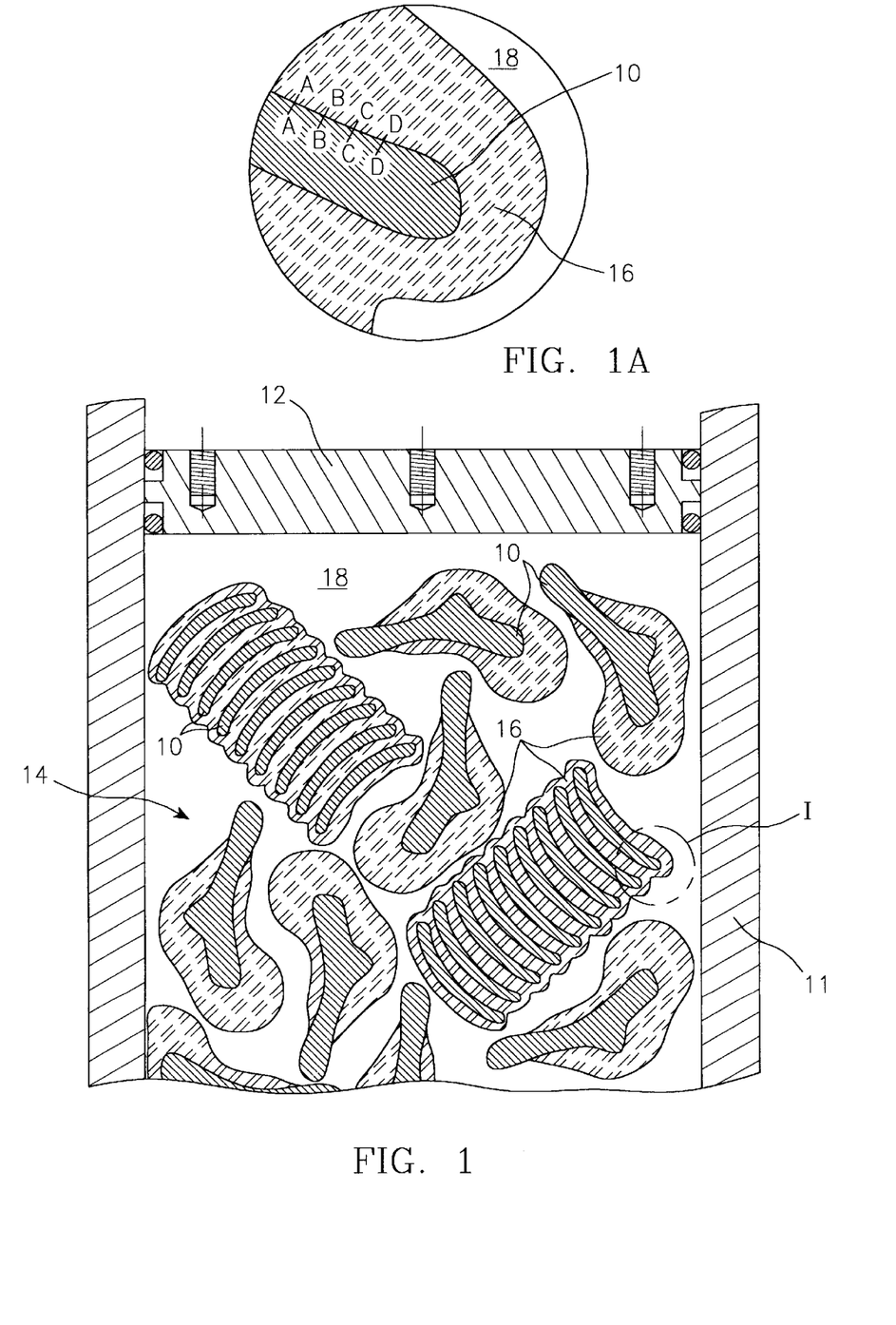
FIG. 1 is a diagrammatic representation of bones and attached meat, the bones being suspended within a substantially fluid medium according to the invention.
FIG. 1A is an enlarged diagrammatic representation of area I shown in FIG. 1.
Figure 2:
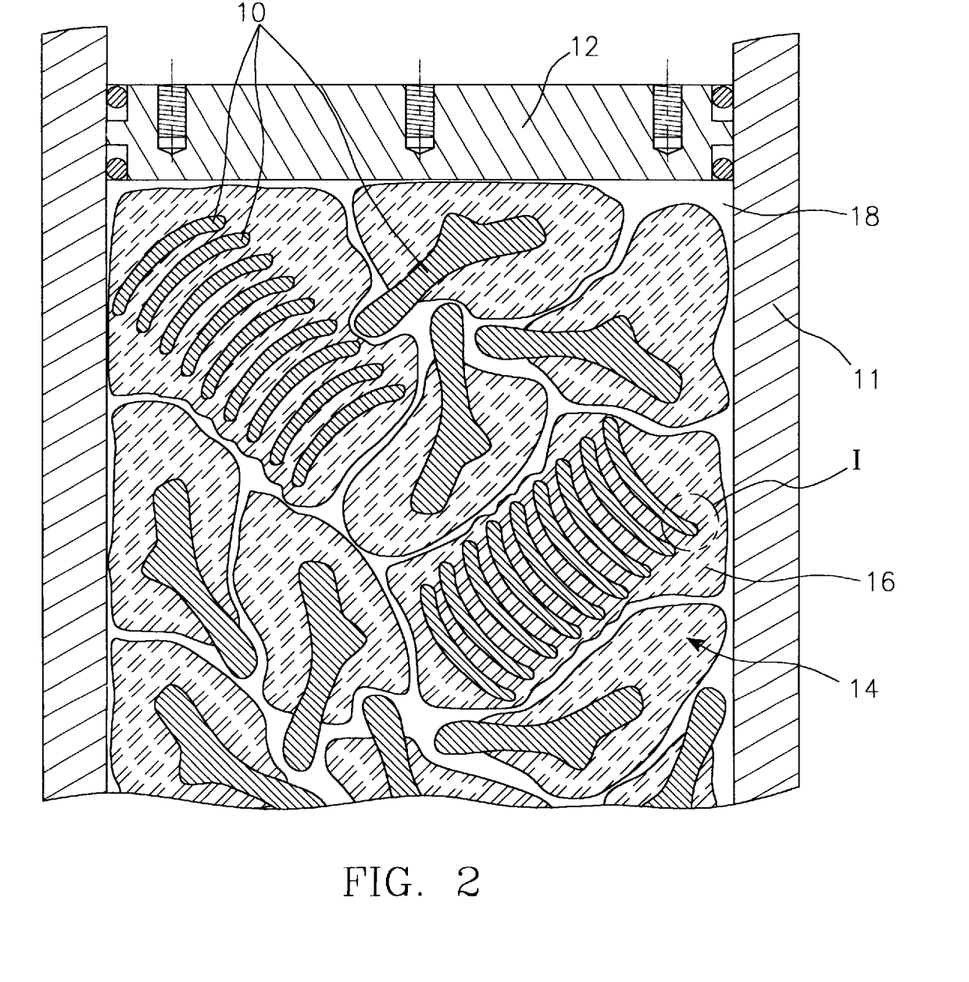
FIG. 2 is a substantially diagrammatic representation similar to FIG. 1 showing the reaction of the meat attached to the bone as pressure is applied through the substantially fluid medium.
Figure 3:
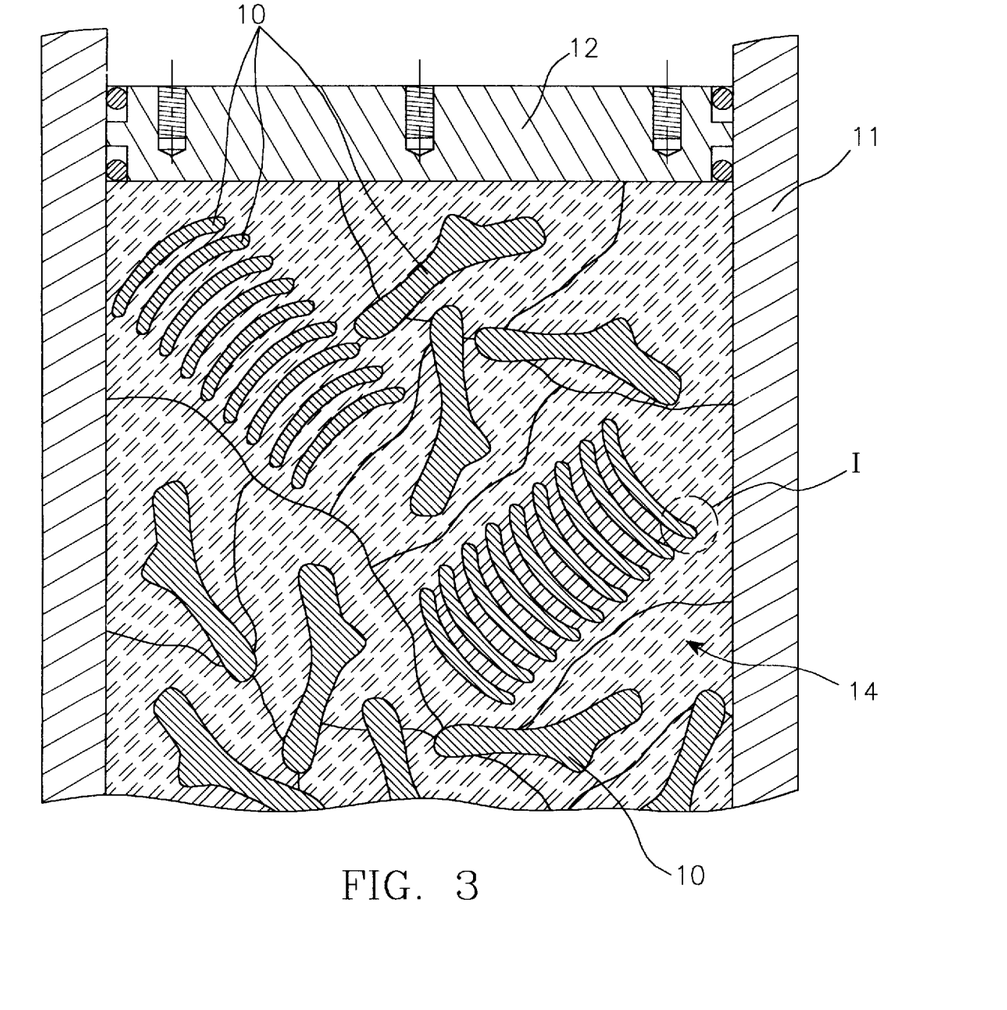
FIG. 3 is a substantially diagrammatic representation similar to FIGS. 1 and 2 showing the condition of the bone after the detachment pressure is applied.

FIGS. 1 through 3 illustrate the manner in which meat is detached from bone according to the invention. In FIG. 1, bones 10 having meat to be detached are suspended in a matrix 14 comprising a substantially fluid medium. The matrix 14 is contained within a cylinder 11 having a piston 12 which may be moved within the cylinder 11 to compress the matrix. The substantially fluid medium or matrix of material 14 includes bones 10, soft material 16 such as meat and soft material associated with meat, and a substantially compressible material 18. Examples of soft material in addition to the meat include fat and sinew. The substantially compressible material 18 is preferably a gas such as air contained in voids between individual pieces of the soft material 16.

It will be apparent to those skilled in the art that certain components of the matrix of material 14, particularly the bones 10, are not themselves a fluid material. However, the matrix 14 as a whole represents a flowable mixture at temperatures above freezing, and behaves similarly to a fluid, particularly in the way forces are transferred within the mixture. This mixture or matrix of material 14 is defined as "substantially fluid" for purposes of this disclosure.

The compressible material 18 within the matrix 14 may be any substantially compressible material, such as any suitable gas. However, liquids which reduce substantially in volume under pressure may also be used according to the invention. Also, the bones 10 in the matrix 14 are not limited to separated bones or bone pieces, but may comprise bones of a substantial portion of a whole carcass left intact with all of the meat still attached.

Referring still to FIG. 1, bones 10 in the matrix of material 14 each have meat attached thereto. This meat comprises a portion of the soft material 16 and may be detached and separated from the bone, and then incorporated into products such as ground meat, for example. This meat included in soft material 16 is commonly connected by tissue along the length of the bone 10 and may include one or more major attachment points. The major attachment points are points at which the meat is strongly connected to the bone, while the majority of the connections other than at these strong attachment points are relatively weak in comparison. In certain bone pieces within the matrix 14, the part of the bone having the relatively stronger major attachment points may have been removed in earlier processing, leaving only the relatively weak attachment along the length of the bone piece. In FIG. 1A, the intersections of lines A—A, B—B, C—C, and D—D with the bone 10 each represents an attachment point between meat and bone. Attachment points for lines A—A and B—B comprise weak attachment points while the points for lines C—C and D—D comprise relatively strong attachment points.

According to the invention, each bone 10 in the matrix of material 14 is suspended within the soft material 16 and the compressible medium 18 so that the bones are each substantially surrounded by the soft material 16. In order to provide this arrangement, the matrix 14 requires a substantial amount of soft material 16 relative to the bone 10 and compressible medium 18 within the matrix. For example, the matrix 14 according to the invention may contain 50% bone and compressible medium or less by volume relative to the generally non-compressible, soft material 16. Other volume percentages of bone pieces 10 and compressible medium 18 to soft material 16 may be used according to the invention as long as the bones, whether in contact with other bones or otherwise, each remain substantially suspended in the soft material throughout the process.

Figure 2A:
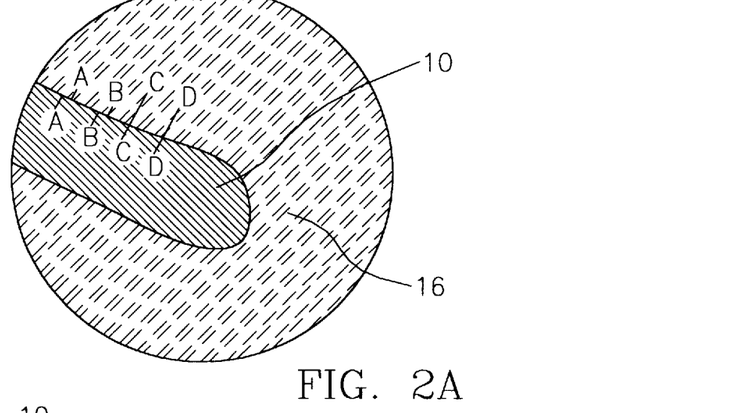
FIG. 2A is an enlarged diagrammatic representation of area I in FIG. 2.

The method of the invention includes first formulating the matrix of material 14 as described above. With the matrix 14 formulated and the bone 10 suspended within the soft material 16 and substantially compressible material 18 at an initial pressure, the method includes compressing the matrix of material. Referring to FIGS. 2 and 2A, as the matrix of material 14 is compressed from the initial pressure, which may be atmospheric pressure, the soft material 16 within the mixture tends to migrate within the mixture. That is, the soft material 16 tends to flow to areas formerly taken up by the voids of compressible medium 18, which are now smaller in volume due to the compressibility of the medium.

Additionally, meat attached to each bone 10 tends to migrate or move relative to the bone to which it is attached. Initially, this tendency to migrate within the matrix of material 14 can overcome the relatively weak attachments to the bone with very little pressure applied to the matrix. As shown in FIG. 2A, the meat at the weak attachment points has detached from the bone 10 as represented by the offset at A—A and B—B.

Regardless of the point in compression at which meat detaches from the bone 10, each bone remains substantially suspended in the substantially fluid material or matrix 14 throughout the compression step. The bones 10 may contact each other, however, they must not become trapped between rigid members of the compressing arrangement, such as piston 12 and opposite end (not shown) of the cylinder 11. Thus, the pressure in the matrix 14 is applied evenly to the bones 10 and normal to each surface on the respective bone piece. This is in contrast to the pressure applied by mechanical contact with other solid material at opposing points on an object, which concentrates force at the contact points. The former contact with the soft material leaves the bones intact even after applying very high pressure, while the latter contact between rigid materials causes the bone to break apart at relatively low pressure. This breaking of bone, which would occur if the bones were not suspended according to the invention, would leave bone fragments in the matrix which would be difficult to separate, and would thus ultimately lower the quality of the recovered meat.

Figure 3A:
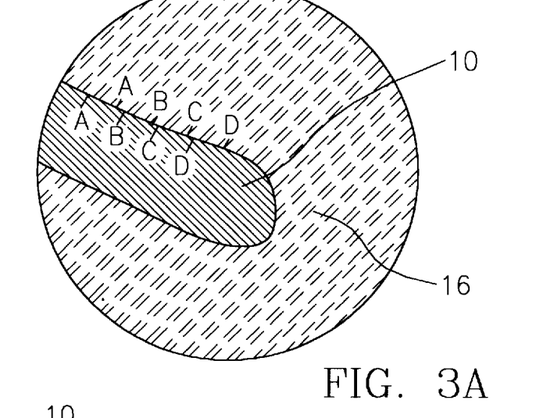
FIG. 3A is an enlarged diagrammatic representation of the area I in FIG. 3.

The method continues by compressing the matrix 14 further until reaching a meat detachment pressure as illustrated in FIGS. 3 and 3A. At this pressure, the tendency for the previously attached meat to migrate overcomes even most of the strong attachment points as illustrated by the offsets at C—C and D—D. Thus at this point, much of the meat formerly attached to the bones 10 is now detached from the bone. While some of the very strong attachment points may still be present, the meat will have detached at the relatively weak attachment points leaving only isolated strong attachment points which can easily be severed by another process to recover the meat.

In FIGS. 3 and 3A, which illustrate the point at which the detachment pressure is applied, meat in the soft material 16 and bones 10 still remain together in the matrix of material 14. In order to recover the meat for use in other products, the meat must still be separated from the bones 10. This separation step may be accomplished in any suitable manner either by hand after the detachment pressure is released, or by any other suitable method.

The pressure at which meat detaches from bone according to the invention varies with the type of meat and the manner in which the meat is left on the bone. For example, pork has relatively weak attachments and requires relatively lower pressure in order to cause the meat to detach from the bones. On the other hand, beef has relatively stronger attachments and requires a higher detachment pressure. In any event, detachment pressures within the scope of the invention range from 5 pounds per square inch or less over atmospheric pressure, to 1000 pounds per square inch or more over atmospheric pressure. Higher pressures, however, may adversely effect the meat and limit the manner in which it may be used. Some attachments may be even too strong to completely separate with pressure alone as discussed above. However, even where one or two attachment points remain, the isolated attachment points may be located easily and the meat may be severed from the bone by hand or otherwise to recover the meat.

Figure 4:
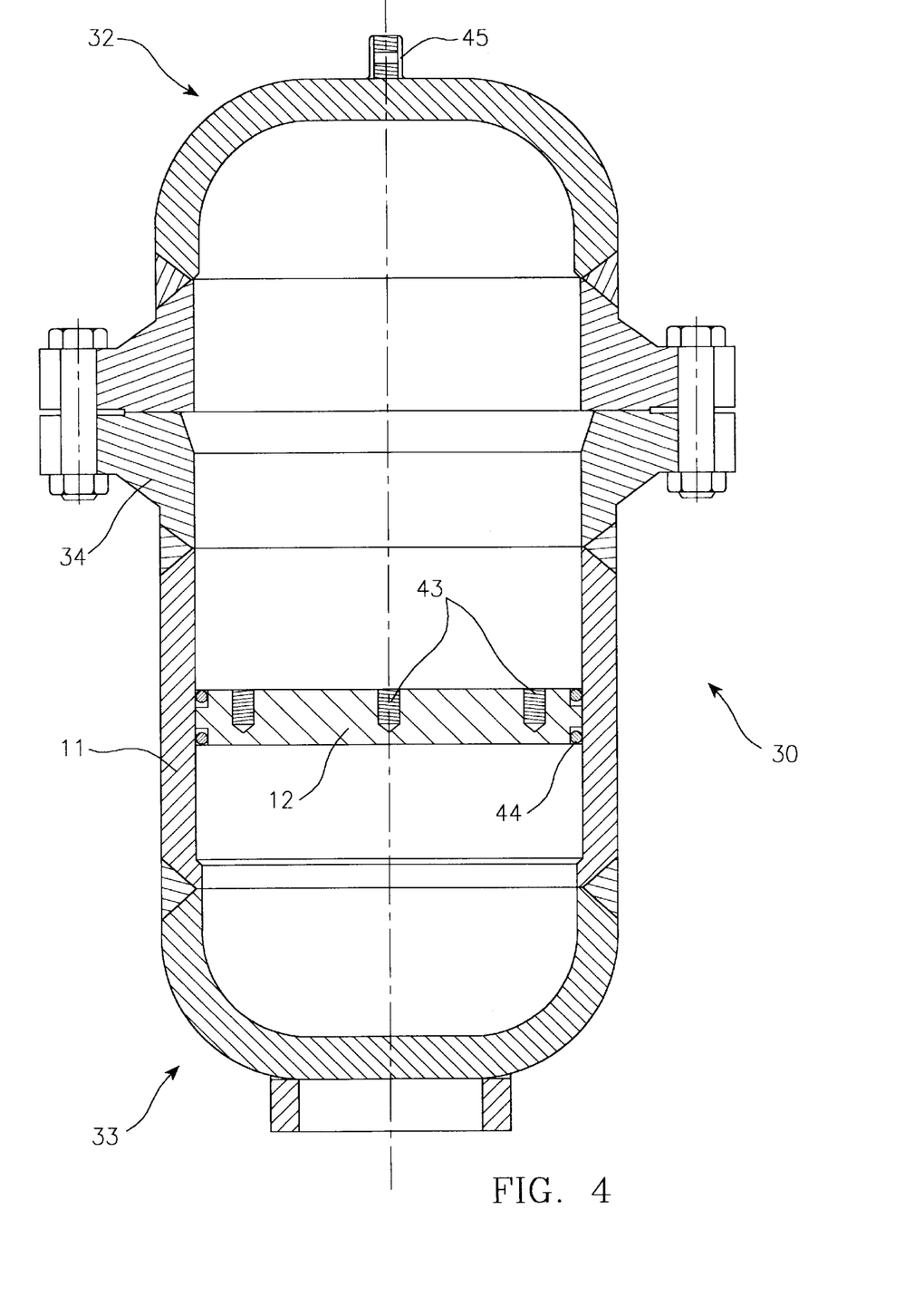
FIG. 4 is a view partially in section showing an apparatus for performing the method according to the invention.

FIG. 4 shows an apparatus 30 for performing the method according to the invention. This apparatus is adapted particularly for test purposes and operates in a batch process. The apparatus 30 includes a cylindrical vessel 11 having a first end 32 and a second end 33 connected together with a flange arrangement 34. The apparatus 30 also includes piston 12 which may be advanced into the second end 33 of the cylinder 11 to apply the detachment pressure, and then retracted using the puller fittings 43. The piston 12 includes suitable seals such as "O" rings 44 for sealing against the cylinder wall as the piston is advanced into the cylinder 11. In the illustrated test apparatus 30, the piston 12 is advanced into the second end 33 of the cylinder 11 by applying fluid pressure above the piston through fitting 45 in the first end 32 of the cylinder. Any other suitable drive arrangement may be used to drive the piston 12 to apply the desired pressure.

In operation, the cylinder 11 is first filled with the matrix of material 14 discussed above with reference to FIGS. 1, 1A, 2, 2A, 3 and 3A. The matrix of material 14 is preferably formulated outside the cylinder 11 in the proper volume ratios to ensure that the bone pieces within the matrix remain surrounded by meat, the other soft material, and the compressible material throughout the compression step. The cylinder 11 is filled by removing the cylinder first end 32 and then pulling the piston 12 from the second end 33 using the puller fittings 43 in the piston. With the piston 12 removed, the material making up the matrix 14 may simply be loaded into the cylinder second end 33 through the opening therein.

Once filled with the matrix of material 14 including bone 10, meat and other soft material 16, and the compressible material 18 (FIG. 1), the piston 12 is placed in the cylinder second end 33, and then the first end 32 is reconnected by flange 34. Fluid pressure is then applied through fitting 45 to advance the piston 12 into the cylinder second end 33. As the piston 12 advances into the cylinder second end 33, it applies pressure to the matrix of material 14, increasing the pressure from the initial pressure to the final detachment pressure at which point the piston is stopped. After applying the detachment pressure, drive fluid pressure is released through fitting 45 and then the first cylinder end 32 may be removed to allow access to the piston 12. The piston 12 may then be retracted and the matrix of material 14 removed for further processing, including separating out the now detached meat from the bones.

Figure 5:
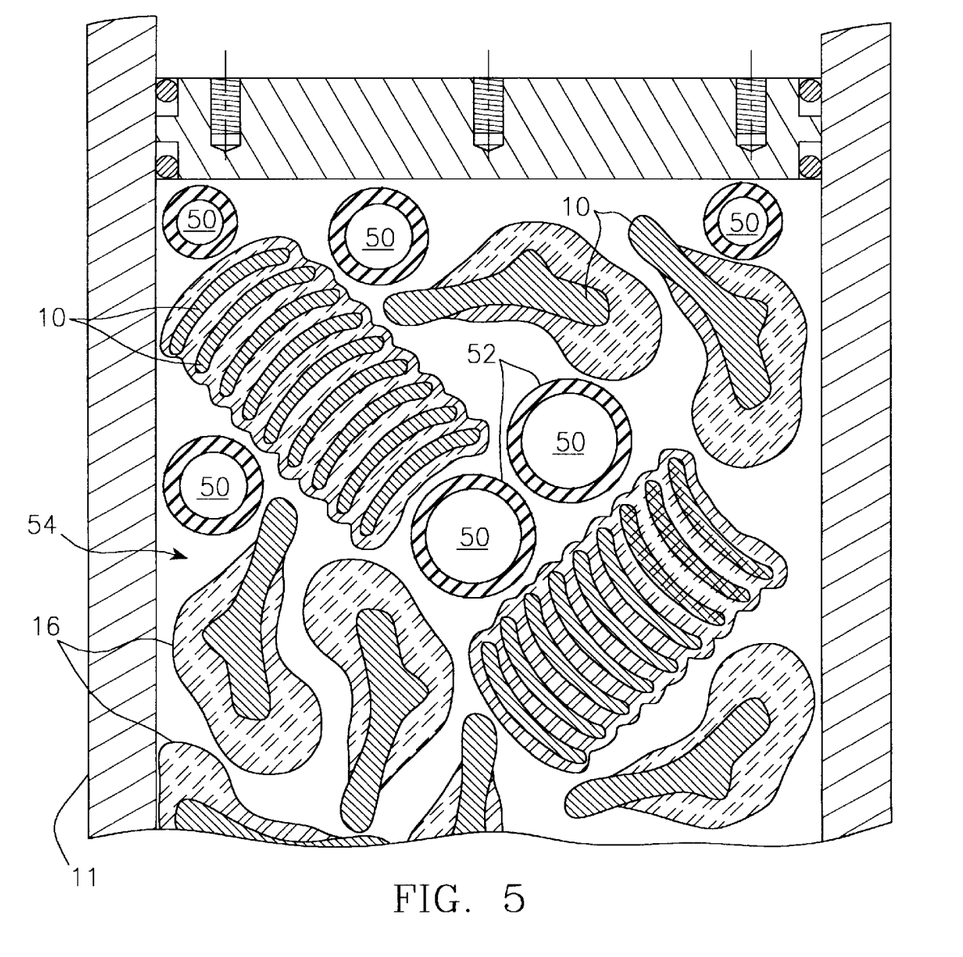
FIG. 5 is a diagrammatic representation showing an alternative matrix of material embodying the principles of the invention.

As shown in FIG. 5, at least a portion of the compressible material may comprise a gas 50 contained in a flexible or elastic container or bladder 52 within the matrix of material 54. These gas filled bladders 52 may be used to help ensure that sufficient compressible medium is left in the matrix to prevent mechanical forces from concentrating at any points on the bones 10 as the matrix 54 is compressed. The bladder 52 may be made from any suitable flexible or elastic material which allows the volume of the bladder to change as pressure is applied to the bladder. The material may be generally any impermeable material such as a plastic or rubber which is suitable for contact with food products. Also, the bladders 52 are precharged with the gas 50 at a pressure below the detachment pressure to be applied to the matrix 54. This gas pressure allows the bladders 52 to collapse as the pressure rises to the detachment pressure in the matrix 54. The collapse in the bladders 52 allows the meat 16 in the matrix to move with respect to the bones 10 and detach as discussed above with reference to FIGS. 2, 2A, 3 and 3A.

Figure 6:
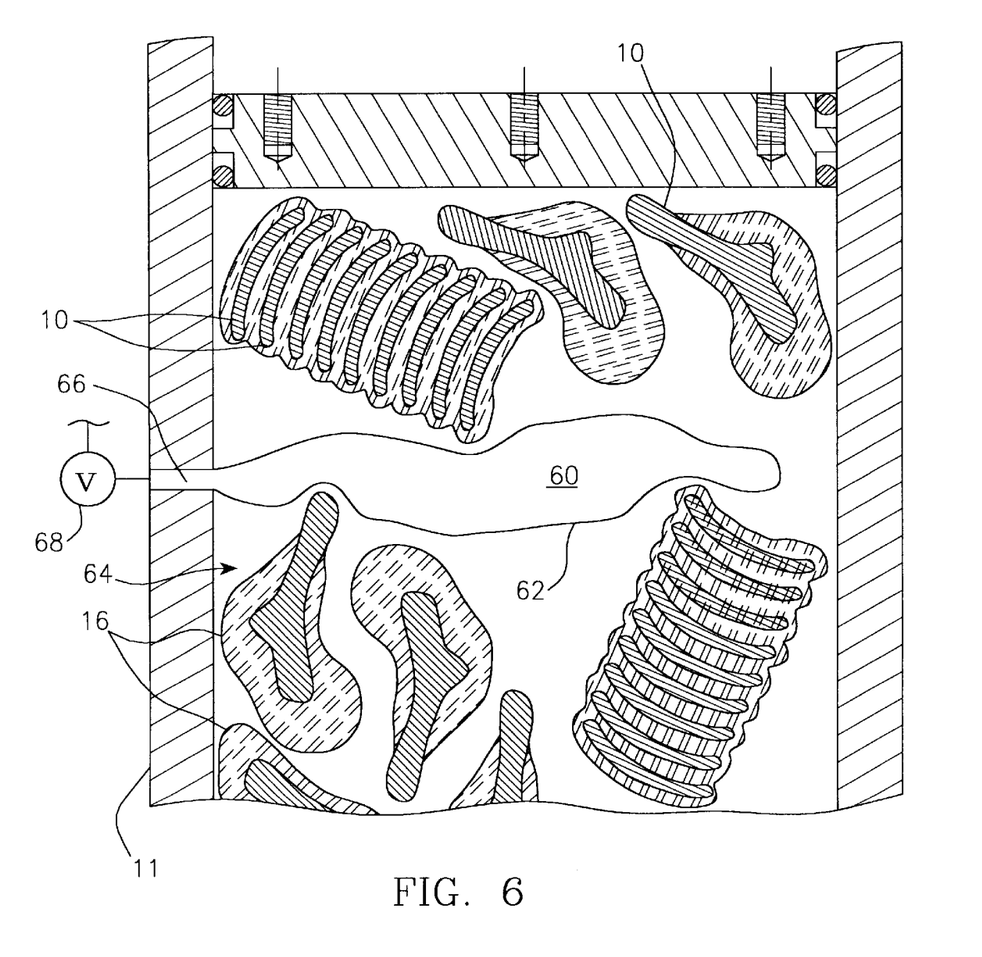
FIG. 6 is a diagrammatic representation showing another alternate matrix of material.

FIG. 6 shows another alternate matrix of material 64. In this matrix 64, at least a portion of the compressible material or medium comprises one or more fluid filled bladders 62. The fluid 60 in the bladders 62 may be a compressible gas, or a substantially incompressible liquid. Each bladder 62 is connected by a passage 66 to the exterior of the cylinder 11 and a valve 68 controls the flow of fluid to or from the bladder. The bladders 62 function similarly to the bladders 52 and collapse or reduce in volume as pressure increases on the matrix 64, allowing meat 16 to move with respect to the bones 10 as the pressure increases. Unlike the form of the invention shown in FIG. 5, however, the passage 66 and valve 68 allow the pressure to be regulated in the bladders 62 and allow the bladder volume to change even when the material contained in the bladder is incompressible. When the fluid 60 is incompressible, the fluid may be removed from the bladder 62 as the pressure increases in the matrix 64. This fluid removal reduces the volume of the bladder 62 and facilitates the required movement between the meat 16 and bone pieces 10. As with bladder 52 in FIG. 5, bladder 62 may be made from any suitable impermeable food handling grade flexible or elastic material.

Passage 66 and valve 68 arrangement shown in FIG. 6 also allows one or more of the flexible bladders 62 to be used to increase the pressure in the matrix 64. In this case, the fluid is pumped by a suitable pump (not shown) or otherwise forced through passage 66, increasing the volume of the bladder 62 and raising the pressure on the matrix 64. When one or more of the bladders 62 are used to apply pressure to the matrix 64, other bladders 62, or bladders such as 52 in FIG. 5 or some other compressible material must be included in the matrix.

The shapes of the bladders 52 in FIG. 5 and bladders 62 in FIG. 6 are not limited to the illustrated shapes. The bladders 52 need not be spherical and the bladders 62 need not be elongated. Other forms of the invention may comprise simply an area of flexible material incorporated into the wall of a cylinder 11 or other suitable device for containing the matrix of material. Such a flexible wall would allow sufficient movement within the matrix to facilitate the relative movement between the meat 16 and the bone pieces 10 to produce the desired detachment.

The above described preferred embodiments are intended to illustrate the principles of the invention, but not to limit the scope of the invention. Various other embodiments and modifications to these preferred embodiments may be made by those skilled in the art without departing from the scope of the following claims. For example, the method according to the invention need not be performed in a batch process such as the process performed by the test apparatus shown in FIG. 4. In other forms of the invention, the detachment pressure may be applied in a continuous process rather than in discrete batches of the matrix.

We claim:

1. A method of detaching meat from bone, the method comprising the steps of:

(a) forming a matrix of material comprising bones, a compressible medium, and soft material, including meat attached to at least one of the bones; and (b) applying fluid pressure to the entire surface area of each bone in the matrix of material so as to increase the compressive force on each bone in the matrix of material from an initial pressure to a detachment pressure, the bones in the matrix being subjected substantially only to fluid pressure throughout the compression from the initial pressure to the detachment pressure.

2. The method of claim 1 wherein the detachment pressure is over 5 pounds per square inch and the initial pressure is substantially atmospheric pressure.

3. The method of claim 1 wherein the compressible medium included in the matrix of material comprises a gas.

4. The method of claim 1 further comprising:

(a) including the step of containing the matrix of material within a vessel during the step of applying the fluid pressure; and (b) wherein the step of applying the fluid pressure comprises advancing a piston into the vessel containing the matrix of material.

5. A method of detaching meat from bone, the method comprising the steps of:

(a) suspending a piece of bone and meat attached thereto, in a substantially fluid medium including a substantially compressible medium; and (b) increasing the pressure applied to the substantially fluid medium from an initial pressure to a meat detachment pressure.

6. The method of claim 5 wherein the substantially compressible medium comprises a gas contained within the substantially fluid medium.

7. The method of claim 6 further comprising the step of:

(a) containing the gas in at least one bladder.

8. The method claim 7 wherein the step of containing the gas comprises:

(a) containing the gas in a plurality of sealed bladders distributed throughout the matrix of material.

9. The method of claim 6 wherein the substantially fluid medium comprises meat, fat, soft material associated with meat, the compressible medium, and bones suspended within the meat, fat, soft material, and compressible medium.

10. The method of claim 5 wherein:

(a) the step of suspending the piece of bone in the substantially fluid medium is performed within a vessel; and (b) wherein the step of increasing the pressure in the substantially fluid medium comprises advancing a piston into the vessel.

11. The method of claim 5 wherein the meat detachment pressure is over 5 pounds per square inch over atmospheric pressure.

12. The method of claim 5 wherein the substantially compressible medium comprises at least one fluid-filled bladder and further comprising the step of:

(a) reducing the volume of the fluid-filled bladder as the pressure applied to the substantially fluid medium increases.

13. The method claim 12 wherein the step of reducing the volume of the fluid-filled bladder comprises removing fluid therefrom.

14. An apparatus for detaching meat from bone, the apparatus comprising:

(a) a vessel capable of containing a matrix of material as the material is compressed from an initial pressure to a detachment pressure;

(b) a vessel input associated with the vessel, and through which the matrix of material may be introduced into the vessel;

(c) compressing means associated with the vessel for increasing the compressive force applied to the matrix of material within the vessel from the initial pressure to the detachment pressure; and (d) wherein the matrix of material comprises soft material associated with meat, a compressible medium, and bones having meat attached thereto, the volume of meat and soft material being sufficient in relation to the volume of bones and compressible medium to ensure that fluid pressure is applied to the entire surface area of each bone in the matrix of material as the pressure in the vessel increases from the initial pressure to the detachment pressure.

15. The apparatus of claim 14 wherein:
    (a) the vessel comprises a cylinder having a first end and a closed second end; and
    (b) the compressing means comprises (i) a piston adapted to advance toward the second end of the cylinder in response to a piston drive force and (ii) means for applying the piston drive force.

16. The apparatus of claim 14 wherein the initial pressure is approximately atmospheric pressure and the detachment pressure is over 5 pounds per square inch over atmospheric pressure.

17. The apparatus of claim 14 wherein the compressible medium in the matrix of material comprises a gas.

18. The apparatus of claim 14 further comprising:
    (a) at least one bladder contained within the vessel.

19. The apparatus of claim 13 wherein the bladder is filled with a gas at a pressure less than the detachment pressure so that the bladder may decrease in volume as the pressure in the vessel is increased from the initial pressure to the detachment pressure.

20. The apparatus of claim 18 wherein each bladder contains a fluid and further comprising:
    (a) a separate passage associated with each bladder, each passage allowing fluid communication between the respective bladder and an area external to the vessel.

* * * * *